(12) United States Patent
Austin

(10) Patent No.: US 9,949,460 B2
(45) Date of Patent: Apr. 24, 2018

(54) STORAGE GARMENT

(71) Applicant: William L. Austin, Henderson, NV (US)

(72) Inventor: William L. Austin, Henderson, NV (US)

(*) Notice: Subject to any disclaimer, the term of this patent is extended or adjusted under 35 U.S.C. 154(b) by 420 days.

(21) Appl. No.: 14/624,332

(22) Filed: Feb. 17, 2015

(65) Prior Publication Data

US 2016/0157589 A1    Jun. 9, 2016

Related U.S. Application Data

(60) Provisional application No. 62/070,080, filed on Aug. 15, 2014.

(51) Int. Cl.
*A01K 27/00* (2006.01)

(52) U.S. Cl.
CPC ................... *A01K 27/008* (2013.01)

(58) Field of Classification Search
CPC ..... A01K 27/00; A01K 27/002; A01K 27/008
USPC ........................................... 119/850
See application file for complete search history.

(56) References Cited

U.S. PATENT DOCUMENTS

| | | | |
|---|---|---|---|
| 5,060,833 A | 10/1991 | Edison et al. | |
| 5,297,835 A * | 3/1994 | Wengler | A01K 15/00 294/146 |
| D383,255 S * | 9/1997 | Caditz | D30/145 |
| 5,887,772 A * | 3/1999 | Dooley | A01K 1/0263 119/858 |
| D429,391 S * | 8/2000 | Grady | D30/152 |
| 6,516,748 B1 * | 2/2003 | Jackson | A01K 27/006 119/72 |
| 6,571,745 B2 * | 6/2003 | Kerrigan | A01K 13/006 119/792 |
| 6,679,198 B1 * | 1/2004 | LaGarde | A01K 15/02 119/792 |
| 6,820,780 B2 * | 11/2004 | Forsman | B65D 77/28 215/306 |
| 7,497,186 B2 * | 3/2009 | Dorton | A01K 13/006 119/72 |
| 8,955,461 B2 * | 2/2015 | Lloyd | A01K 15/02 119/719 |
| 2002/0074369 A1 * | 6/2002 | Forsman | A45F 3/16 224/148.2 |
| 2003/0079695 A1 * | 5/2003 | Kerrigan | A01K 13/006 119/858 |

(Continued)

*Primary Examiner* — Monica L Williams
*Assistant Examiner* — Aaron M Rodziwicz
(74) *Attorney, Agent, or Firm* — Eric Brandon Lovell; Timothy Marc Shropshire; Garrett James O'Sullivan

(57) ABSTRACT

A storage garment stores a liquid in an interior bladder providing facilitated access to the liquid while it is carried inside the storage garment. A jacket is configured to be worn by a user, such as a dog. The jacket forms a substantially contoured fit over the user and has a harness portion that fastens around the user. At least one pocket portion in the jacket holds at least one bladder portion. The bladder portion holds liquid, such as water, to hydrate or clean. A pocket fastener regulates access to the bladder. A tube portion carries liquid to the user and a valve portion regulates the liquid flow. A pump portion forces the liquid out of the bladder through an outlet. A secondary pocket holds a container that folds for stowage and expands into a bowl shape for holding liquid.

18 Claims, 11 Drawing Sheets

(56) References Cited

U.S. PATENT DOCUMENTS

| | | | | |
|---|---|---|---|---|
| 2004/0079775 A1* | 4/2004 | Choi | ............... | F16L 37/0841 |
| | | | | 224/148.2 |
| 2004/0128747 A1* | 7/2004 | Bumbarger | ........ | A41D 13/0053 |
| | | | | 2/458 |
| 2005/0035160 A1* | 2/2005 | Forsman | ............... | A45F 3/14 |
| | | | | 224/148.2 |
| 2005/0072376 A1* | 4/2005 | Kerrigan | ............ | A01K 13/006 |
| | | | | 119/850 |
| 2008/0067201 A1* | 3/2008 | Obstler | ............... | A01K 7/00 |
| | | | | 224/148.2 |
| 2009/0199776 A1* | 8/2009 | Alexander | ............ | A01K 7/06 |
| | | | | 119/61.56 |
| 2010/0294801 A1* | 11/2010 | Fulcher | ............... | A45C 11/00 |
| | | | | 222/95 |
| 2016/0023807 A1* | 1/2016 | Tappan | ............ | A01K 27/008 |
| | | | | 383/120 |
| 2016/0128306 A1* | 5/2016 | Conley | ............... | B31B 29/60 |
| | | | | 206/38 |

* cited by examiner

STORAGE GARMENT

CROSS-REFERENCE TO RELATED APPLICATIONS

The present Utility patent application claims priority benefit of the U.S. provisional application for patent Ser. No. 62/070,080 Doggie Camel Pack, 2014 Aug. 15, under 35 U.S.C. 119(e). The contents of this related provisional application are incorporated herein by reference for all purposes to the extent that such subject matter is not inconsistent herewith or limiting hereof.

RELATED CO-PENDING U.S. PATENT APPLICATIONS

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

FIELD OF THE INVENTION

One or more embodiments of the invention generally relate to a storage garment. More particularly, the invention relates to a storage garment that stores a consumable liquid in an interior bladder and provides facilitated access to the liquid while being worn.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that a bladder is a large, flexible container used to store many types of liquids, and even gases. When maximum capacity is reached, the bladder takes the form of a large pillow and carries with it an amount of weight.

It is known that hot temperatures can be dangerous for people, and can even be more dangerous for pets. People can cut back on clothing but pets have fur coats even in the hottest weather. Pet owners are constantly seeking convenient ways to keep their pet cool and hydrated during long walks, particularly in such hot weather. The walks are important for the pet to get their exercise and, yet, owners have to be careful not to let the pet go too long without water and not let them get overheated.

Typically, water provides effective hydration for the pet. Overheated pets, such as dogs have been known to have heat strokes. The pet may also need toys, food, and training tools. These are generally carried separately from the pet.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2A illustrates a side view, and FIG. 2B illustrates a top view, in accordance with an embodiment of the present invention;

FIG. 5A illustrates the bladder portion partially inserted inside an exemplary pocket portion, and FIG. 5B illustrates a top view of the bladder portion with an exemplary inlet and an exemplary outlet, in accordance with an embodiment of the present invention;

Figure 1:
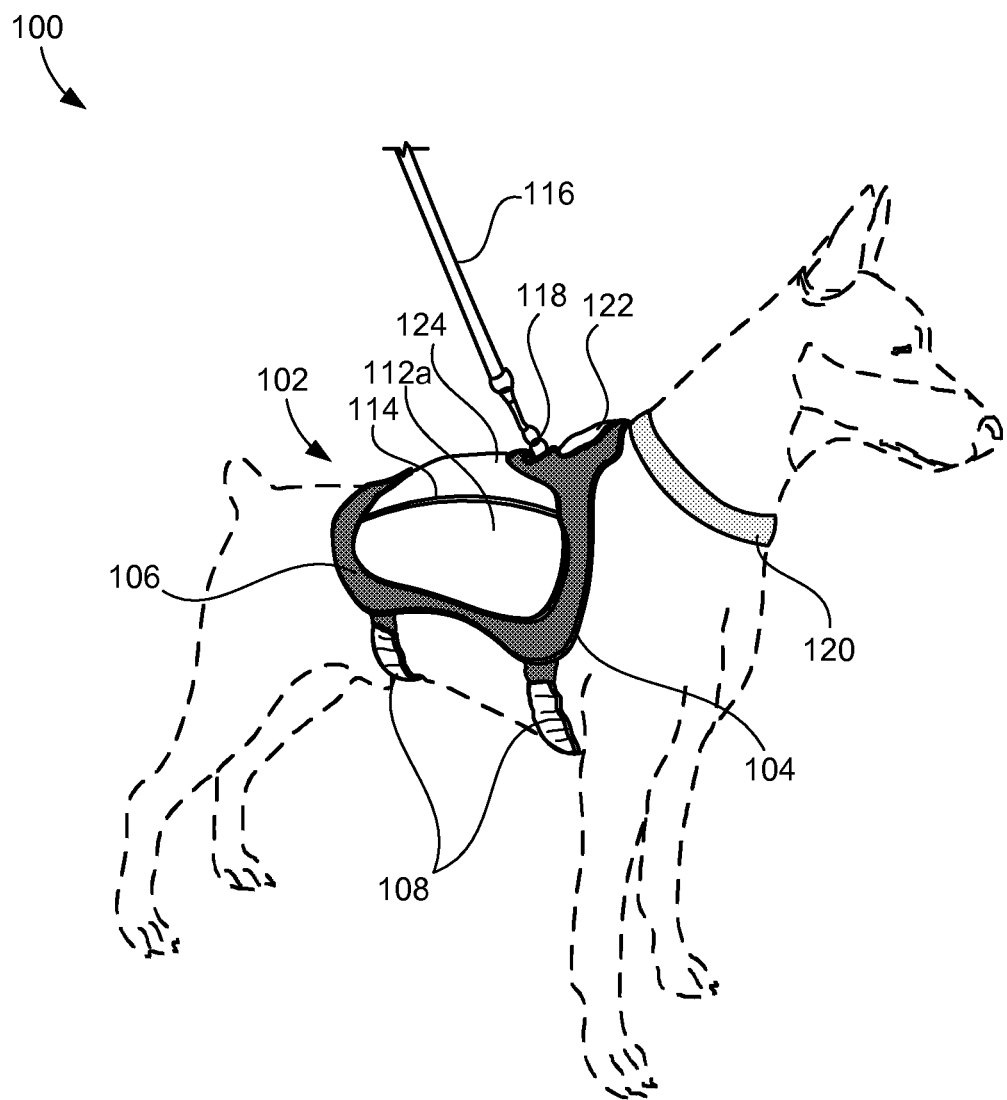
FIG. 1 illustrates a perspective view of an exemplary storage garment being worn by a dog, in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, is well settled law, as early as 1939, that words of approximation are not indefinite in the claims even when such limits are not defined or specified in the specification.

For example, see Ex parte Mallory, 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See Energy Absorption Sys., Inc. v. Roadway Safety Servs., Inc., Civ. App. 96-1264, slip op. at 10 (Fed. Cir. Jul. 3, 1997) (unpublished) Hybridtech v. Monoclonal Antibodies, Inc., 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See Seattle Box Co. v. Industrial Crating & Packing, Inc., 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See In re Frye, Appeal No. 2009-006013, 94 USPQ2d 1072, 1077, 2010 WL 889747 (B.P.A.I. 2010) Depending on its usage, the word "substantially" can denote either language of approximation or language of magnitude. Deering Precision Instruments, L.L.C. v. Vector Distribution Sys., Inc., 347 F.3d 1314, 1323 (Fed. Cir. 2003) (recognizing the "dual ordinary meaning of th[e] term ["substantially"] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forwardmost point of the upper or outsole and the rearwardmost point of the upper or outsole.

Similarly, term 'substantially' is well recognize in case law to have the dual ordinary meaning of connoting a term of approximation or a term of magnitude. See Dana Corp. v. American Axle & Manufacturing, Inc., Civ. App. 04-1116, 2004 U.S. App. LEXIS 18265, *13-14 (Fed. Cir. Aug. 27, 2004) (unpublished). The term "substantially" is commonly used by claim drafters to indicate approximation. See Cordis Corp. v. Medtronic AVE Inc., 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also Deering Precision Instruments, LLC v. Vector Distribution Sys., Inc., 347 F.3d 1314, 1322 (Fed. Cir. 2003); Epcon Gas Sys., Inc. v. Bauer Compressors, Inc., 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claims of the present invention with respect to such words of approximation as contemplated in the foregoing. That is, under such circumstances, relying on the written description and prosecution history to reject the ordinary and customary meanings of the words themselves is impermissible. See, for example, Liquid Dynamics Corp. v. Vaughan Co., 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In Cordis Corp. v. Medtronic AVE, Inc., 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In Anchor Wall Systems v. Rockwood Retaining Walls, Inc., 340 F.3d 1298, 1311 (Fed. Cir. 2003)" Id. at 1311. Similarly, the plain language of Claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see Deering Precision Instruments, L.L.C. v. Vector Distrib. Sys., Inc., 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see Epcon, 279 F.3d at 1031 ("The phrase 'substantially constant' denotes language of approximation, while the phrase 'substantially below' signifies language of magnitude, i.e., not insubstantial."). Also, see, e.g., Epcon Gas Sys., Inc. v. Bauer Compressors, Inc., 279 F.3d 1022 (Fed. Cir. 2002) (construing the terms "substantially constant" and "substantially below"); Zodiac Pool Care, Inc. v. Hoffinger Indus., Inc., 206 F.3d 1408 (Fed. Cir. 2000) (construing the term "substantially inward"); York Prods., Inc. v. Cent. Tractor Farm & Family Ctr., 99 F.3d 1568 (Fed. Cir. 1996) (construing the term "substantially the entire height thereof"); Tex. Instruments Inc. v. Cypress Semiconductor Corp., 90 F.3d 1558 (Fed. Cir. 1996) (construing the term "substantially in the common plane"). In conducting their analysis, the court instructed to begin with the ordinary meaning of the claim terms to one of ordinary skill in the art. Prima Tek, 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see AK Steel Corp. v. Sollac, 344 F.3d 1234, 68 USPQ2d 1280, 1285 (Fed. Cir. 2003) where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit—"about 10%"—the ordinary meaning is that the endpoint is included.

In the present specification and claims, a goal of employment of such words of approximation, as contemplated in the foregoing, is to avoid a strict numerical boundary to the modified specified parameter, as sanctioned by Pall Corp. v. Micron Separations, Inc., 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see Verve LLC v. Crane Cams Inc., 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. § 112, and indeed may be necessary in order to provide the inventor with the benefit of his invention. In Andrew Corp. v. Gabriel Elecs. Inc., 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in Ecolab Inc. v. Envirochem, Inc., 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see Ecolab Inc. v. Envirochem Inc., 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter."; e.g., see Pall Corp. v. Micron Seps., 66 F.3d 1211, 1217, 36 USPQ2d 1225, 1229 (Fed. Cir. 1995); see, e.g., Andrew Corp. v. Gabriel Elecs. Inc., 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see Ex parte Mallory, 52 USPQ 297, 297 (Pat. Off. Bd. App. 1941) where, for example, the court said "the claims specify that the film is "substantially" eliminated and for the intended purpose, it is believed that the slight portion of the film which may remain is negligible. We are of the view, therefore, that the claims may be regarded as sufficiently accurate." Similarly, In re Hutchison, 104 F.2d 829, 42 USPQ 90, 93 (C.C.P.A. 1939) the court said "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" includes the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples, or referenced prior-art that may (or may not) be provided in the present patent.

References to "end user", or any similar term, as used herein, is generally intended to mean late stage user(s) as opposed to early stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A memory controller comprising a system cache . . . ." Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.Csctn.112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of."

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation of any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

The present invention will now be described in detail with reference to embodiments thereof as illustrated in the accompanying drawings.

There are various types of storage garments for storing consumable liquids that may be provided by preferred embodiments of the present invention. In one embodiment of the present invention, a storage garment stores a consumable liquid in an interior bladder and provides facilitated access to the liquid while it is carried inside the storage garment. In one embodiment, the storage garment may include a jacket that is configured to be worn by a user, such as an animal. The jacket may form a substantially contoured fit over the backside of the user and have a plurality of harnesses that are arranged to fasten to specific portions of the user. However, in other embodiments, the jacket may be worn by a human, a plant, or a robot. In one embodiment, the jacket may be carried on a dog's back for transporting drinking water that is accessible whenever needed while the jacket is still on the dog's back. In another possible embodiment, the jacket may also form a backpack for carrying water or ice water that will cool the dog while the dog is carrying such water on his back.

Additionally, the jacket may enable the user to have facilitated access to the liquid through a tube portion and a detachable liquid container. In this manner, the user may easily access the liquid for hydration and for cleaning waste, while still wearing the jacket. The jacket may include a front end adapted to be positioned against a user's back, and a rear end opposite the front end. However, in other embodiments, the jacket may be adapted to join with the user's front. In either case, the jacket is configured to strap onto the user in a manner that is not bothersome or uncomfortable to the user.

The jacket may also include an outer surface and an inner surface. The jacket may further include at least one front harness portion and at least one rear harness portion for securely securing the jacket around the appropriate body area of the user. A harness fastener, such as a buckle, may be used to fasten the ends of the harness. This may be especially beneficial while moving vigorously or running A cable may attach to the outer surface of the jacket at a cable fastener and/or a collar.

The jacket may include at least one pocket portion, accessible from the outer surface. The at least one pocket portion may be joined into the front end and the back end of the jacket. The pocket portion may include an opening for retaining at least one bladder portion. The at least one bladder portion may store the liquid. The bladder portion may be inserted through the opening of the pocket portion and securely stored. The bladder portion may be carried on the lateral sides, or on the upper side region of the jacket. Those skilled in the art will recognize that loading the bladder portion on the upper side makes the weight of the liquid easier to carry and tolerate as opposed to if it were on the direct sides of the jacket, and dog.

The bladder portion is such that it can dispense the liquid to the user while the bladder portion is in the pocket portion. The bladder portion may be comprised of a resilient material that expands as the liquid is added therein. The pocket portion comprises at least one hidden zipper with an overlay or flap to help prevent engagement with barbs.

The liquid may be discharged from the bladder portion through a plurality of means. In one embodiment, since the bladder portion is elevated on the back of the user, gravity may enable the liquid to flow downwardly from the bladder portion and through the tube. In another embodiment, the flexible composition of the bladder portion enables pressure to be exerted on the surface of the bladder portion, such that the liquid is forced out from an outlet in the bladder portion. In yet another embodiment, a small pump may pump the liquid out of the bladder portion. Conversely, the bladder portion may be filled with liquid through similar means, only in reverse and through an inlet.

In some embodiments, the pocket portion may be larger than the bladder portion, so as to fully contain the bladder portion, the liquid inside the bladder portion, the tube portion, and an assortment of items. The bladder portion may be ergonomically shaped to conform to the natural body shape of the user. Thus, one aspect of the jacket is that it can be adapted to be worn by variously sized and dimensioned users. Additionally, when holding the liquid, the bladder portion may provide a cushion for the user.

In some embodiments, a tube portion may extend from the outlet in the bladder portion. The tube portion may carry the liquid out of the bladder portion for access outside the jacket. In some embodiments, the tube portion may include a bladder end and a discharge end. The bladder end of the tube portion may include a bifurcated tube that accesses liquid from two separate bladder portions. The two tubes join together into a single tube at a T-junction leading away from the bladder portion.

However, in other embodiments, any number of bladder portions and tube portions may be used. In this embodiment, the outlet for each bladder portion may be selectively opened and closed for accessing the liquid from one of the bladder portions, or all of the bladder portions simultaneously. In some embodiments, a valve portion may position at the discharge end of the tube portion for regulating the flow of the liquid, and for restricting the liquid from leaking out of the tube portion when not in use. A pump portion may also be used for pumping the liquid out of the bladder portion. A pocket fastener on the pocket portion, such as a zipper, may regulate access to the bladder portion and the tube portion.

In some embodiments, the tube portion may be of sufficient length to reach the mouth of the user while the bladder portion remains in the pocket portion. However, the jacket also includes a detachable liquid container that stores in at least one secondary pocket portion. The container may include a resilient bowl that stores flat inside the at least one secondary pocket portion. The container may be removed from the secondary pocket portion and configured into the shape of a bowl for holding the liquid. In this manner, the tube portion may carry the liquid directly into the container while the jacket is being worn.

In one embodiment, the secondary pocket portion is on the top rear region of the jacket. The secondary pocket portion may include the pocket that holds a foldable container, such as a drinking bowl and other accessories such as dog toys. In one embodiment, the jacket may include two bladder holding pockets, one on each side of the jacket. The jacket may also include a dispensing pocket disposed generally on the top frontal area of the jacket that holds a discharge end of the at least one tube portion. Thus, in one embodiment, there are four pockets: two pocket portions for holding the at least one bladder portion; one secondary pocket for holding the container; and a dispensing pocket for holding the discharge end of the at least one tube portion.

FIG. 1 illustrates a perspective view of an exemplary storage garment being worn by a dog, in accordance with an embodiment of the present invention. In one aspect, a storage garment 100 stores a consumable liquid in an interior bladder and provides facilitated access to the liquid while it is carried inside the storage garment. In one embodiment, the storage garment may include a jacket 102 that is configured to be worn by a user, such as an animal. The jacket may form a substantially contoured fit over the backside of the user and have a plurality of harnesses that are arranged to fasten to specific portions of the user. However, in other embodiments, the jacket may be worn by a human, a plant, or a robot.

Suitable materials for the jacket may include, without limitation, a mesh, a cotton, a polyester, wool, a synthetic material, and a nonwoven material. The jacket may be porous to enable free flow of air, while still being sufficiently strong to support the weight of liquids. Additionally, the jacket may be worn while the user, such as a dog, is performing rigorous physical activities, such as a working canine, or playing Frisbee and fetch.

In one possible embodiment, the jacket may be carried on a dog's back for transporting drinking water that is accessible whenever needed while the jacket is still on the dog's back. In another possible embodiment, the jacket may also form a backpack for carrying water or ice water that will cool the dog while the dog is carrying such water on his back. In one example, the storage garment may be useful for working dogs such as police canine. The storage garment may also be modified to hold specific items for working dogs. In one embodiment, the jacket may wrap completely around a dog and be secured in numerous fastening mechanisms, including, without limitation, zippers, hook-and-loop, buttons, and magnets.

Additionally, the jacket may enable the user to have facilitated access to the liquid through a tube portion and a detachable liquid container. In this manner, the user may easily access the liquid for hydration and for cleaning waste, while still wearing the jacket. The jacket may include a front end 104 adapted to be positioned against a user's back, and a rear end 106 opposite the front end. However, in other embodiments, the jacket may be adapted to join with the user's front. In either case, the jacket is configured to strap onto the user in a manner that is not bothersome or uncomfortable to the user.

The jacket may also include an outer surface and an inner surface. The jacket may further include at least one front harness portion 108 and at least one rear harness portion for securely securing the jacket around the appropriate body area of the user. A harness fastener 110, such as a buckle, may be used to fasten the ends of the harness. This may be especially beneficial while moving vigorously or running A cable 116 may attach to the outer surface of the jacket at a cable fastener 118 and/or a collar 120. The cable may include, without limitation, a leash, a chain, a rope, and twine.

The jacket may include at least one pocket portion 112a, 112b. The at least one pocket portion may be disposed along the sides of the jacket and accessible from the outer surface of the jacket. The at least one pocket portion may be joined into the front end and the back end of the jacket. The pocket portion may include an opening 114 for retaining at least one bladder portion. The bladder portion may be inserted through the opening of the pocket portion and securely stored. The bladder portion may be carried on the lateral sides, or on the upper side region of the jacket. Those skilled in the art will recognize that loading the bladder portion on the upper side makes the weight of the liquid easier to carry and tolerate as opposed to if it were on the direct sides of the jacket, and dog.

The at least one bladder portion may be sized and dimensioned to store the liquid. The bladder portion is such that it can dispense the liquid to the user while the bladder portion is in the pocket portion. The bladder portion may be comprised of a resilient material that expands as the liquid is added therein. The pocket portion comprises at least one hidden zipper with an overlay or flap to help prevent engagement with barbs. In one possible embodiment, two pocket portions are symmetrically spaced along the sides of the jacket.

The liquid may be discharged from the bladder portion through a plurality of means. In one embodiment, since the bladder portion is elevated on the back of the user, gravity may enable the liquid to flow downwardly from the bladder portion and through the tube. In another embodiment, the flexible composition of the bladder portion enables pressure to be exerted on the surface of the bladder portion, such that the liquid is forced out from an outlet in the bladder portion. In yet another embodiment, a small pump may pump the liquid out of the bladder portion. Conversely, the bladder portion may be filled with liquid through similar means, only in reverse and through an inlet.

In some embodiments, the pocket portion may be larger than the bladder portion, so as to fully contain the bladder portion, the liquid inside the bladder portion, the tube portion, and an assortment of items. The bladder portion may be ergonomically shaped to conform to the natural body shape of the user. Thus, one aspect of the jacket is that it can be adapted to be worn by variously sized and dimensioned users. Additionally, when holding the liquid, the bladder portion may provide a cushion for the user. However, in another embodiment, the bladder portion inside the pocket portion, which is chiefly used to carry liquids for consumption, may be filled with air to provide buoyancy to the user.

In one embodiment, a secondary pocket portion 124 is disposed in the top rear region of the jacket. The secondary pocket portion may be positioned adjacently thereto, may be used to hold additional items, including a container for retaining the liquid. The secondary pocket portion may include the pocket that holds a foldable container, such as a drinking bowl and other accessories such as dog toys. In one embodiment, the jacket may include two bladder holding pockets, one on each side of the jacket.

In some embodiments, the jacket may also include a dispensing pocket portion 122 disposed generally on the top frontal area of the jacket, directly behind the secondary pocket portion. The dispensing pocket portion may hold a discharge end of the at least one tube portion that extends from a bladder end and a valve portion. Thus, in one embodiment, there are four pockets: two pocket portions for holding the at least one bladder portion; one secondary pocket for holding the container; and a dispensing pocket portion for holding the discharge end of the at least one tube portion.

Figure 2A:
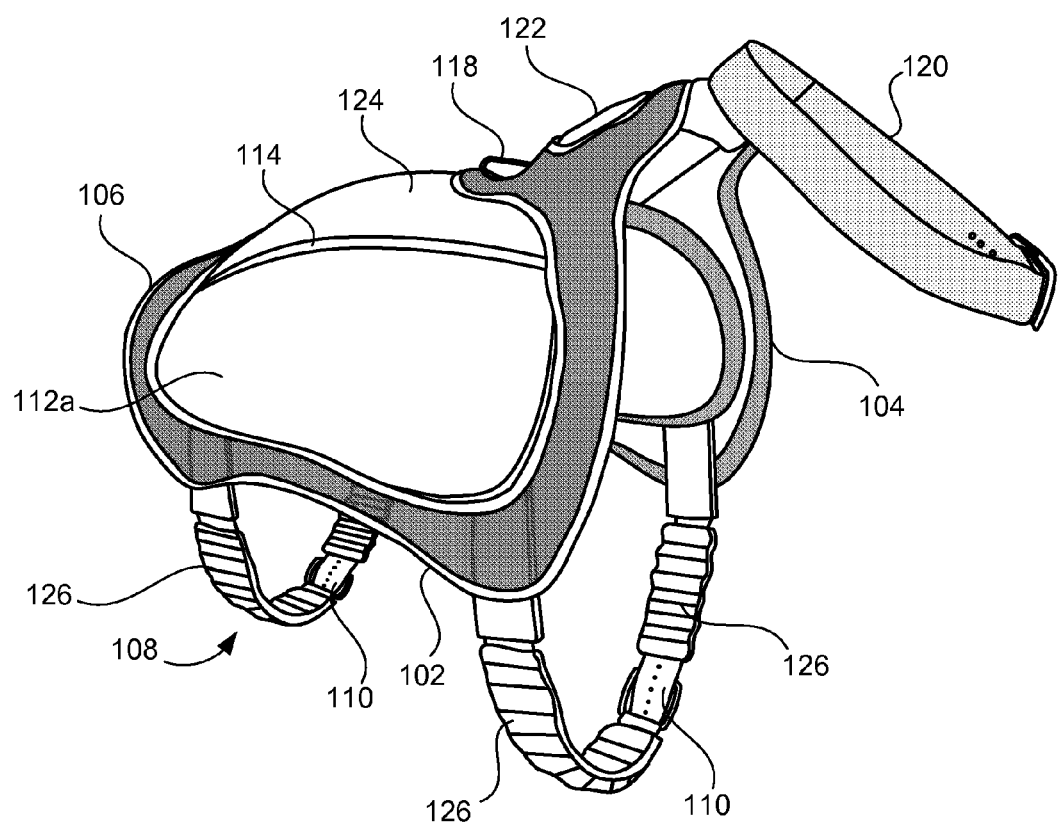
FIGS. 2A and 2B illustrate perspective views of an exemplary storage garment, where
Figure 2B:
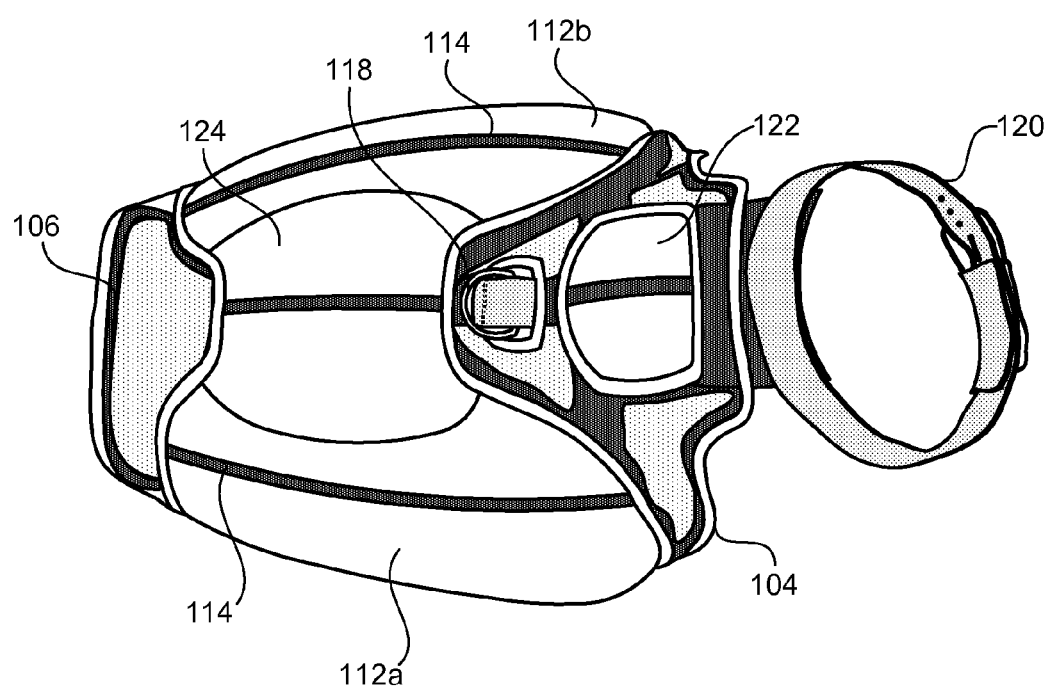

FIGS. 2A and 2B illustrate perspective views of an exemplary storage garment, where FIG. 2A illustrates a side view, and FIG. 2B illustrates a top view, in accordance with an embodiment of the present invention. In one aspect, the jacket and the pocket portion form a substantial part of the visible outer area of the storage garment. In one embodiment, the jacket may include an illumination portion (not shown) that illuminates. The illumination portion may include, without limitation, light emitting diodes, bulbs, and reflectors. The illumination portion may be used to protect the user from traffic or for signaling.

In one alternative embodiment, advertising text and graphics may display from the jacket and pocket portion. In another embodiment, the storage garment may be used to locate lost pets, or may be used to track a dog. In this embodiment, the storage garment may have tracking devices, including, without limitation, electronic and/or satellite devices, such as but not limited to a global positioning system, receptor and/or transmitter, location beacons, and a satellite telephone.

Figure 3:
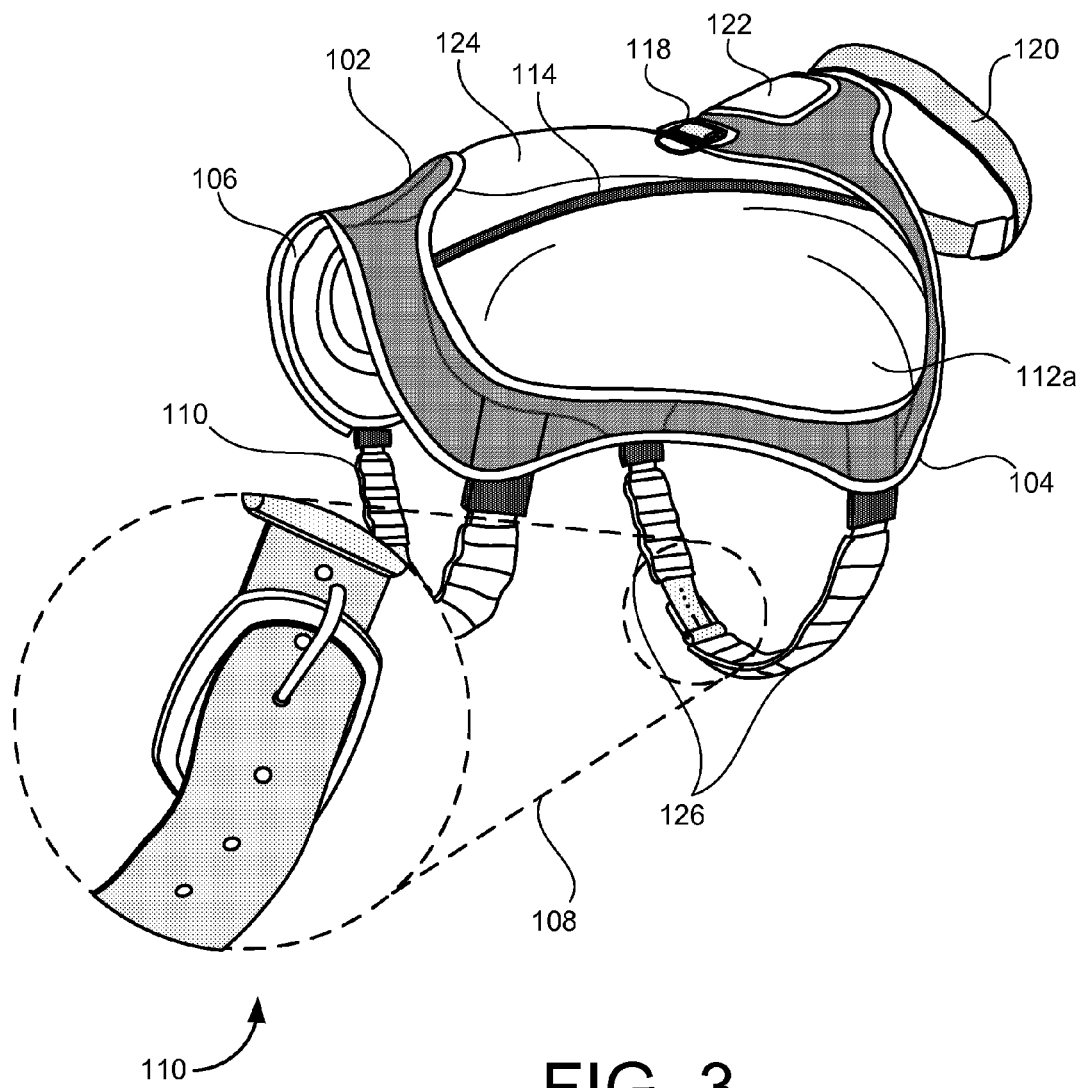
FIG. 3 illustrates a perspective view of an exemplary storage garment and a close-up view of an exemplary harness portion, in accordance with an embodiment of the present invention.

FIG. 3 illustrates a perspective view of an exemplary storage garment and a close-up view of an exemplary harness portion, in accordance with an embodiment of the present invention. In one aspect, the at least one harness portion comprises a rear and front harness for securely securing the jacket around the appropriate body area of the user. The front harness may wrap around the upper belly of a dog, while the rear harness may wrap around the lower back of the dog. The harness fastener may then secure each harness into place. The harness portion is configured to not collect flora and other items with which the user may make contact, such as barbs, thorns and other vegetation. For example, the harness fastener does not include a hook and loop fastener material that picks up such flora. In one embodiment, the straps of the harness portion feature at least one cushioned sleeve 126. The cushioned sleeve may include portions that cover the actual straps of the harness portion. The cushioned sleeves provide cushioning to the pet, prevent friction burns, and also because they have a smooth surface prevent pick up of vegetation.

Figure 4:
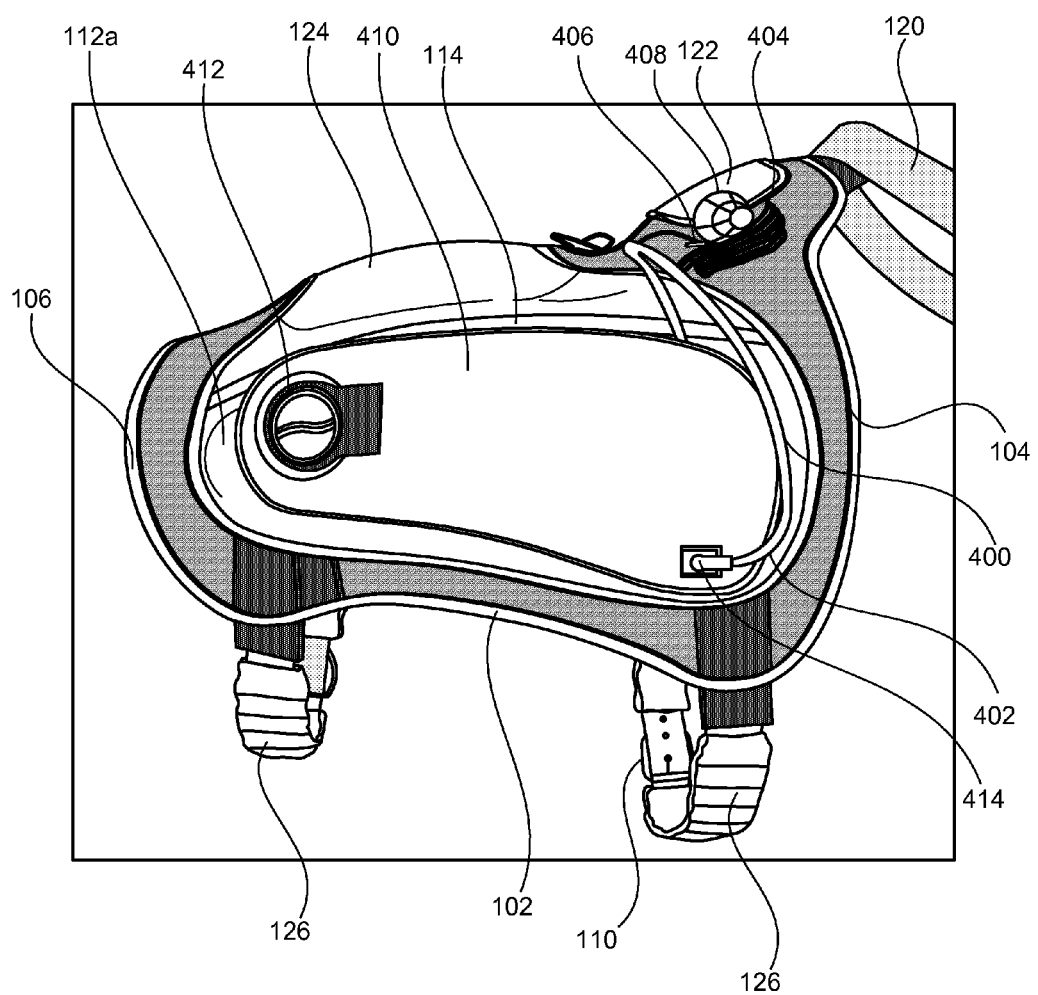
FIG. 4 illustrates a sectioned perspective view of an exemplary storage garment with an exemplary tube portion stored inside an exemplary pocket portion, in accordance with an embodiment of the present invention.

FIG. 4 illustrates a sectioned perspective view of an exemplary storage garment with an exemplary tube portion stored inside an exemplary pocket portion, in accordance with an embodiment of the present invention. In one aspect, at least one bladder portion 410 may be sized and dimensioned to store the liquid. In one possible embodiment, the bladder portion may hold up to 32 ounces of water. The bladder portion may be comprised of a resilient material that expands when filling with liquid. The bladder portion is such that it can dispense the liquid to the user while the bladder portion is in the pocket portion. The bladder portion may be comprised of a resilient material that expands as the liquid is added therein. Suitable materials for the bladder portion may include, without limitation, rubber, thermoplastic polyurethane, polyvinyl chloride, synthetic skin, animal skin, and a polymer.

The liquid may be discharged from the bladder portion through an outlet 414. The liquid may also fill the bladder portion through an inlet 412. The outlet may include a small channel that is configured to fit hoses that may extend from the bladder portion. The inlet may include a larger hole that enables liquid to be poured directly into the bladder portion. The liquid is made to flow through a plurality of means. In one embodiment, since the bladder portion is elevated on the back of the user, gravity may enable the liquid to flow downwardly from the bladder portion and through the tube.

In another embodiment, the flexible composition of the bladder portion enables pressure to be exerted on the surface of the bladder portion, such that the liquid is forced out from an outlet in the bladder portion. In yet another embodiment, a small hand pump may pump the liquid out of the bladder portion. However, in other embodiments, any type of pump may be used that forces the flow of liquid, either into or out of the bladder portion. Conversely, the bladder portion may be filled with liquid through similar means, only in reverse and through an inlet.

In some embodiments, the pocket portion may be larger than the bladder portion, so as to fully contain the bladder portion, and the liquid inside the bladder portion. The secondary pocket portion holds the container and an assortment of pet related items, and the dispensing pocket portion holds the dispensing tube. The bladder portion may be ergonomically shaped to conform to the natural body shape of the user. Thus, one aspect of the jacket is that it can be adapted to be worn by variously sized and dimensioned users. Additionally, when holding the liquid, the bladder portion may provide a cushion for the user. However, any number of pockets and bladders may be used, the pockets may have various sizes and hold various liquids.

In some embodiments, a tube portion 400 may extend from the outlet in the bladder portion. The tube portion may carry the liquid out of the bladder portion for access outside the jacket. In some embodiments, the tube portion may include a bladder end 402 and a discharge end 404. Suitable materials for the tube portion may include, without limitation, rubber, thermoplastic polyurethane, and polyvinyl chloride.

The bladder end of the tube portion may include a bifurcated tube that accesses liquid from two separate bladder portions. The two tubes join together into a single tube at a T-junction leading away from the bladder portion. However, in other embodiments, any number of bladder portions and tube portions may be used. In this embodiment, the outlet for each bladder portion may be selectively opened and closed for accessing the liquid from a one of the bladder portions, or all of the bladder portions simultaneously.

In some embodiments, a valve portion 406 may position at the discharge end of the tube portion for regulating the flow of the liquid, and for restricting the liquid from leaking out of the tube portion when not in use. In one embodiment, the valve portion may include a roller valve with a selective knob that increases or decreases the flow of the liquid. A pump portion 408 may also be used for pumping the liquid out of the bladder portion. A pocket fastener on the pocket portion, such as a zipper, may regulate access to the bladder portion. Similarly, a secondary fastener may regulate access to the secondary pocket that holds the discharge end of the tube portion.

In some embodiments, the tube portion may be of sufficient length to reach the mouth of the user while the bladder portion remains in the pocket portion. However, the jacket also includes a detachable liquid container that stores in at least one secondary pocket portion. The container may include a resilient bowl that stores flat inside the at least one secondary pocket portion. The container may be removed from the secondary pocket portion and configured into the shape of a bowl for holding the liquid. In this manner, the tube portion may carry the liquid directly into the container while the jacket is being worn.

Figure 5A:
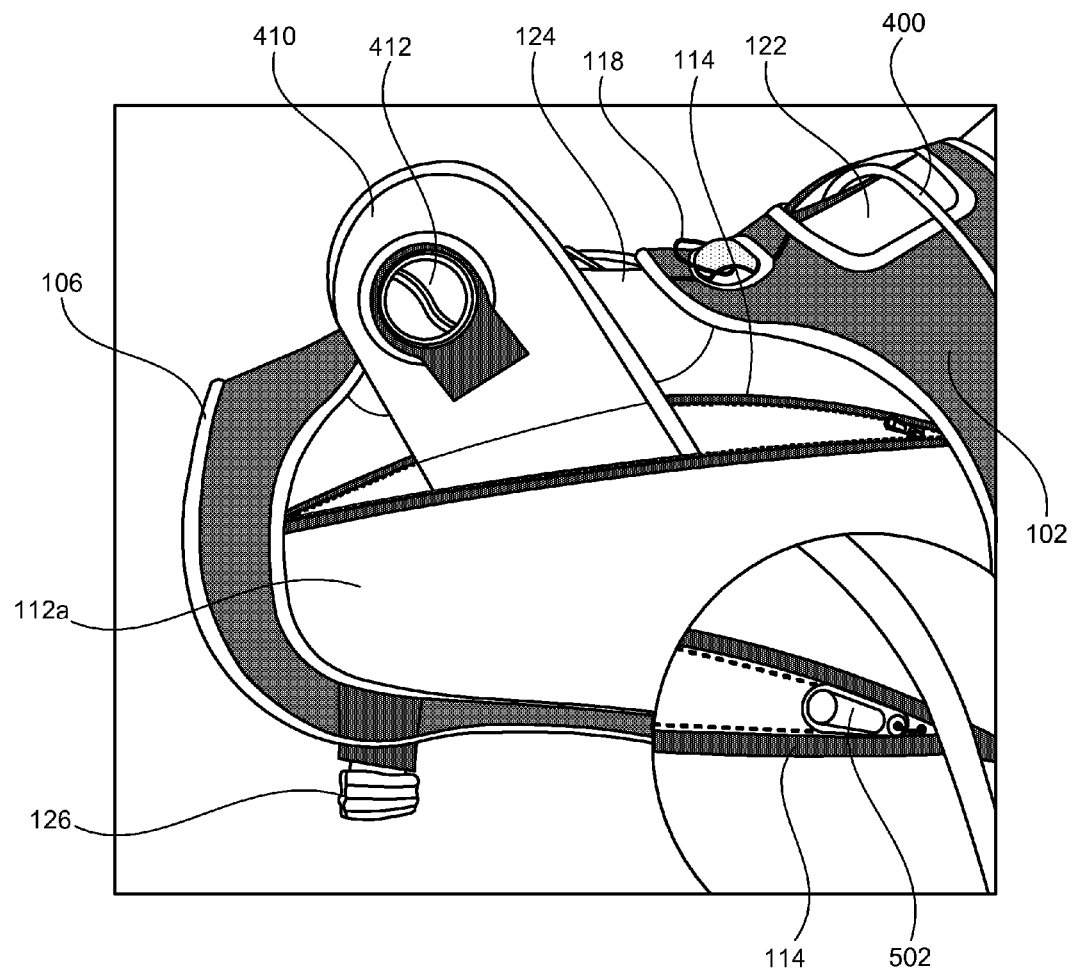
FIGS. 5A and 5B illustrates perspective views of an exemplary bladder portion, where
Figure 5B:
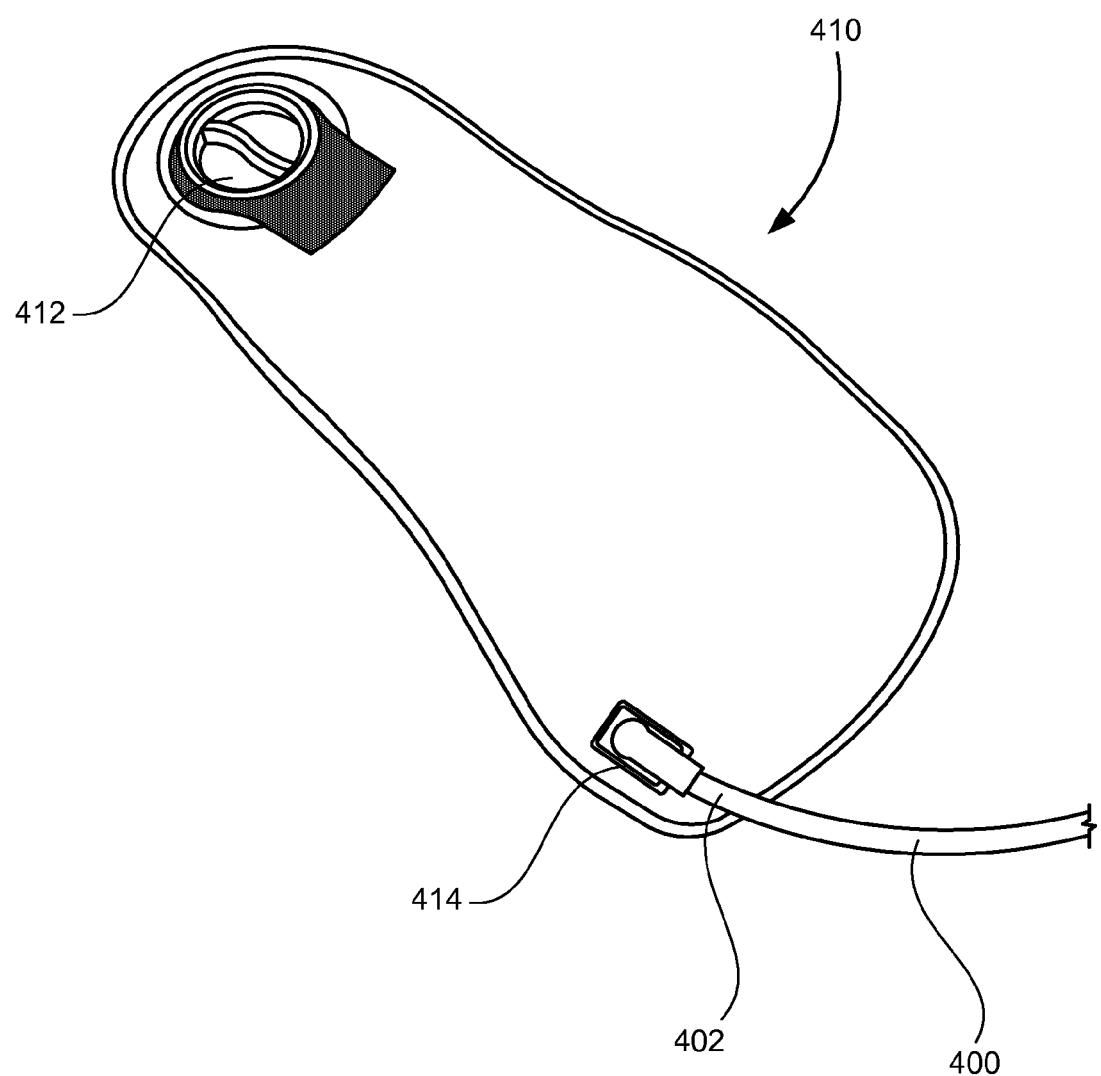

FIGS. 5A and 5B illustrates perspective views of an exemplary bladder portion, where FIG. 5A illustrates the bladder portion partially inserted inside an exemplary pocket portion, and FIG. 5B illustrates a top view of the bladder portion with an exemplary inlet and an exemplary outlet, in accordance with an embodiment of the present invention. In one aspect, a pocket fastener 502 on the pocket portion may regulate access to the bladder portion and the tube portion. The pocket fastener helps prevent the bladder portion from spilling out of the at least one pocket. The pocket fastener may include, without limitation, a zipper, an adhesive, a hook and loop fastener, and a magnet. A cover may overlay the zipper to create a seamless appearance.

Figure 6:
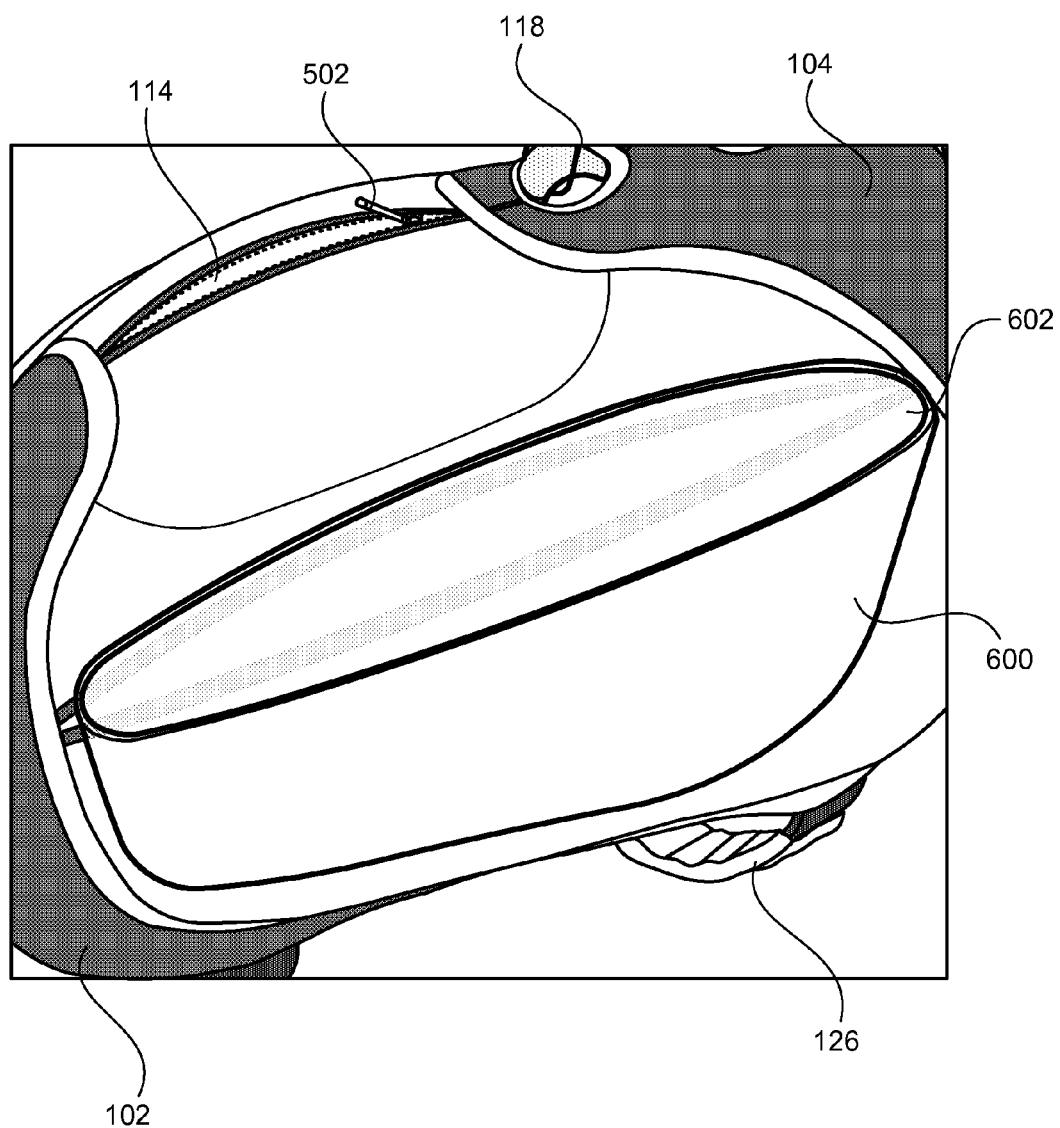
FIG. 6 illustrates a sectioned perspective view of an exemplary insulation portion that lines the interior of the pocket portion adjacent an exemplary jacket, in accordance with an embodiment of the present invention.

FIG. 6 illustrates a sectioned perspective view of an exemplary insulation portion that lines the interior of the pocket portion adjacent an exemplary jacket, in accordance with an embodiment of the present invention. In one aspect, the pocket portion is chiefly used to contain the at least one bladder portion. The bladder portion may contain a liquid. An insulation portion 600 may be used to contain the bladder portion, so as to retain a constant temperature of the liquid therein. The insulation portion may include a pouch that is sized generally the same as the bladder portion. Suitable materials for the insulation portion may include, without limitation, foam, cellulose insulation, polystyrene, plastic, and a porous material. An insulation slit 602 enables passage of the bladder portion into the insulation portion.

However, in other embodiments, the pocket portion may hold items useful for the user, such as a dog. This may include, dog toys, dog food, whistles, training equipment, maps, and ammunition. In another embodiment, air bladders may fill the pocket portion, so as to enable floatation by the storage garment. The pockets can be positioned anywhere on the jacket to include the upper side, the underside and both sidewalls.

Figure 7:
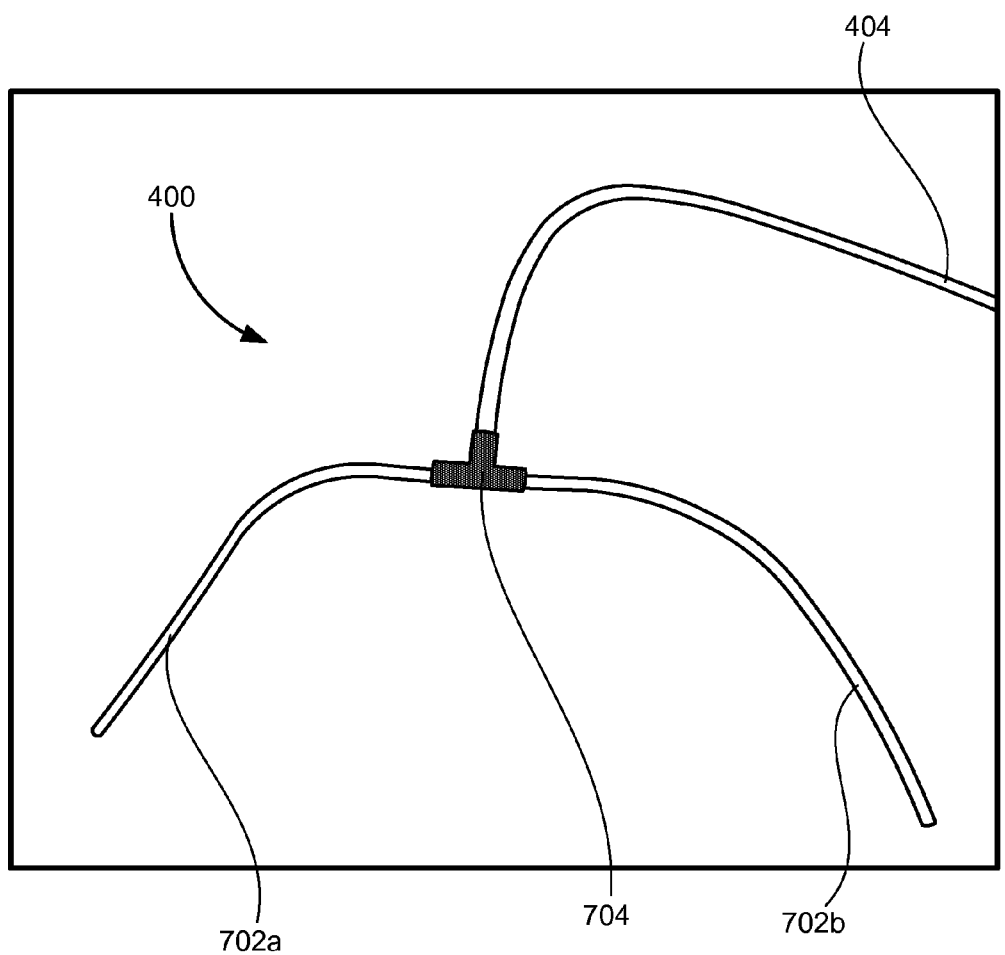
FIG. 7 illustrates a perspective view of an exemplary tube portion having an exemplary bifurcated tube and an exemplary T-joint, in accordance with an embodiment of the present invention.

FIG. 7 illustrates a perspective view of an exemplary tube portion having an exemplary bifurcated tube and an exemplary T-joint, in accordance with an embodiment of the present invention. In one aspect, the tube portion may extend from the outlet in the bladder portion. In some embodiments having one bladder portion, a single tube extends therefrom. However, the storage garment enables multiple bladder portions to be used simultaneously. For example, in one embodiment, two bladder portions position on either side of the jacket. A bifurcated tube 702a, 702b extends from each individual bladder portion. Each tube meets at a T-junction 704 before continuing to the discharge end for enabling access outside the jacket.

Figure 8:
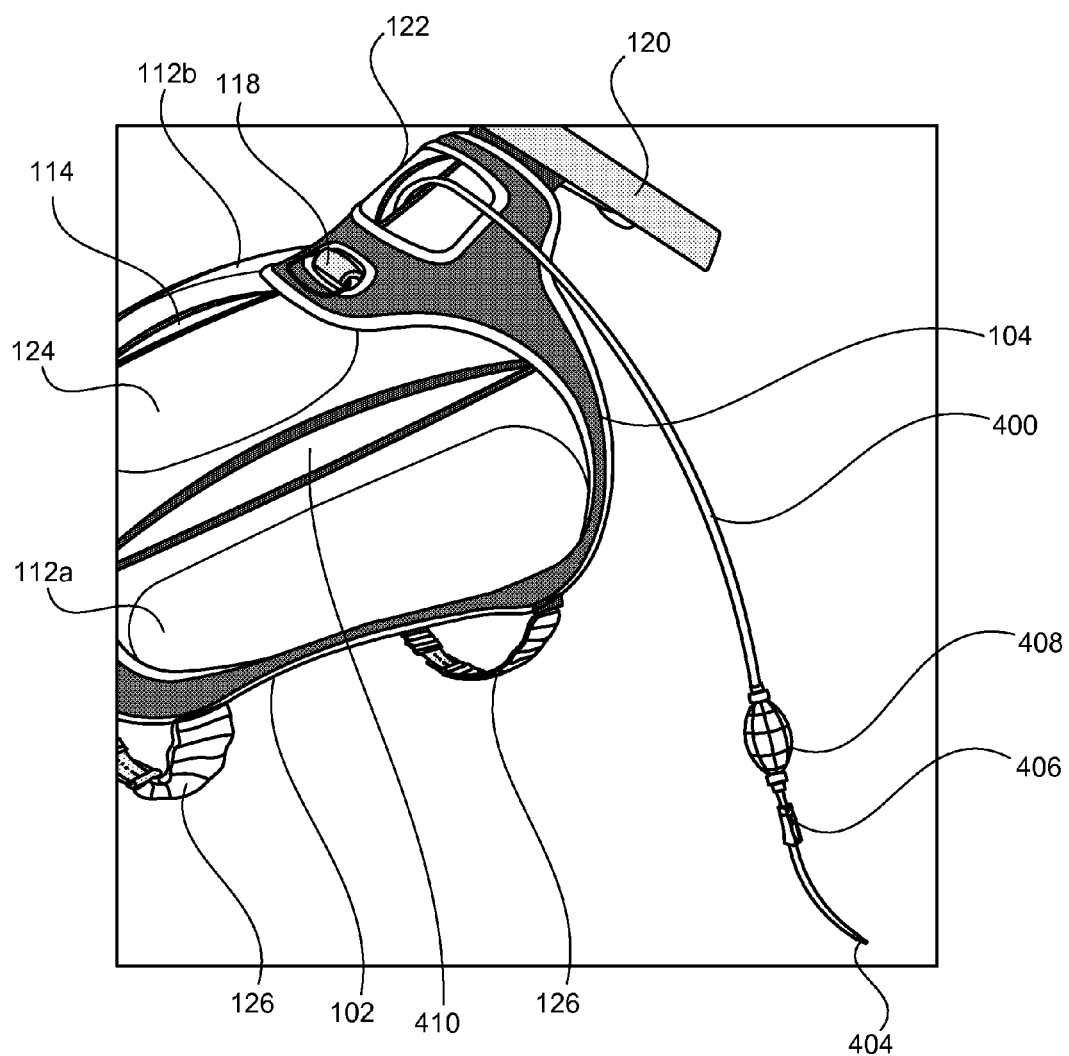
FIG. 8 illustrates a perspective view of an exemplary tube portion extending from an exemplary pocket portion for discharging a liquid, in accordance with an embodiment of the present invention.

FIG. 8 illustrates a perspective view of an exemplary tube portion extending form an exemplary pocket portion for discharging a liquid, in accordance with an embodiment of the present invention. In one aspect, a valve portion may position at the discharge end of the tube portion for regulating the flow of the liquid, and for restricting the liquid from leaking out of the tube portion when not in use. In one embodiment, the valve portion may include a roller valve with a selective knob that increases or decreases the flow of the liquid. However, any type of valve may be used. A pump portion may also be used for pumping the liquid out of the bladder portion. A pocket fastener on the pocket portion, such as a zipper, may regulate access to the bladder portion and the tube portion.

Figure 9:
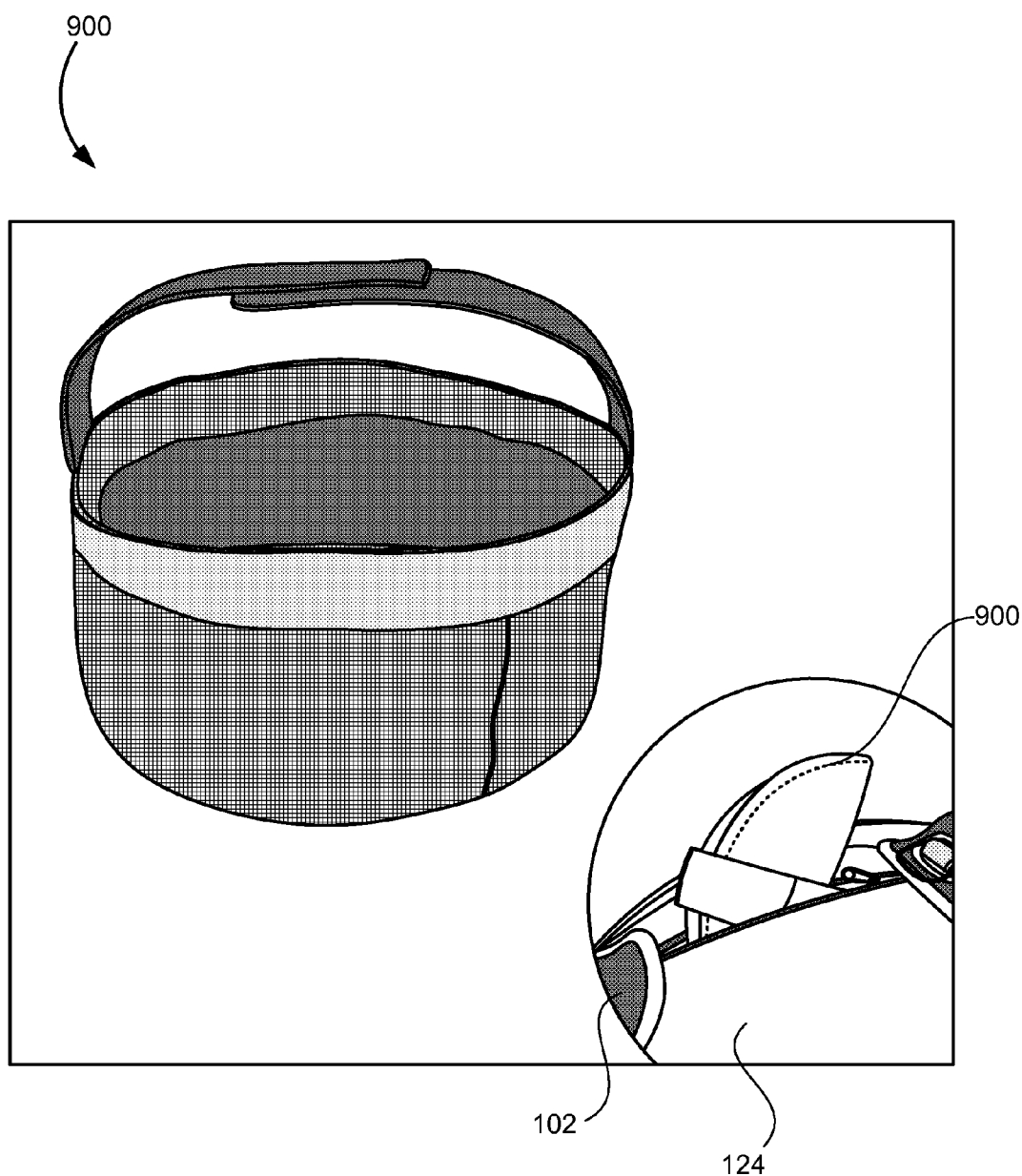
FIG. 9 illustrates a perspective close-up view of an exemplary container fully expanded for use and collapsed for stowage, in accordance with an embodiment of the present invention.

FIG. 9 illustrates a perspective close-up view of an exemplary container fully expanded for use and collapsed for stowage, in accordance with an embodiment of the present invention. In one aspect, the secondary pocket portion may be utilized to hold a container 900. The container may be shaped as a bowl for retaining the liquid. The container may be configured to fold up into a compact shape for stowage, and then be expanded for use. The container may include a substantially waterproof material configured to hold a liquid, such as water. In this manner, a dog can have access to water in a bowl anywhere. The container may take any dimension, including, without limitation, pails, buckets, pots and pans. The container may also take various shapes, including, without limitation, square, round, oval, rectangular.

In one alternative embodiment, the storage garment may be used as a floatation device and a liquid container, whereby additional pockets are added for air bladders. In another alternative embodiment, the container can take additional shapes, such as a bottle for a human to drink from the liquid in the bladder portion. In yet another alternative embodiment, the tube portion can be attached to an external liquid source or an external air source.

Those skilled in the art will readily recognize, in light of and in accordance with the teachings of the present invention, that any of the foregoing steps may be suitably replaced, reordered, removed and additional steps may be inserted depending upon the needs of the particular application. Moreover, the prescribed method steps of the foregoing embodiments may be implemented using any physical and/or hardware system that those skilled in the art will readily know is suitable in light of the foregoing teachings. For any method steps described in the present application that can be carried out on a computing machine, a typical computer system can, when appropriately configured or designed, serve as a computer system in which those aspects of the invention may be embodied. Thus, the present invention is not limited to any particular tangible means of implementation.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC § 112 (1), all claims must be supported by sufficient disclosure in the present patent specification, and any material known to those skilled in the art need not be explicitly disclosed. However, 35 USC § 112 (6) requires that structures corresponding to functional limitations interpreted under 35 USC § 112 (6) must be explicitly disclosed in the patent specification. Moreover, the USPTO's Examination policy of initially treating and searching prior art under the broadest interpretation of a "mean for" claim limitation implies that the broadest initial search on 112(6) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC § 112 (6) when such corresponding structures are not explicitly disclosed in the foregoing patent specification. Therefore, for any invention element(s)/structure(s) corresponding to functional claim limitation(s), in the below claims interpreted under 35 USC § 112 (6), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC § 112 (6) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any $3^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC § 112 (6), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC § 112 (6). Applicant(s) note that all the identified documents above which are incorporated by reference to satisfy 35 USC § 112 (6) necessarily have a filing and/or publication date prior to that of the instant application, and thus are valid prior documents to incorporated by reference in the instant application.

Having fully described at least one embodiment of the present invention, other equivalent or alternative methods of implementing a wearable jacket that holds a liquid during activity and provides facilitated access to the liquid according to the present invention will be apparent to those skilled in the art. Various aspects of the invention have been described above by way of illustration, and the specific embodiments disclosed are not intended to limit the invention to the particular forms disclosed. The particular implementation of the wearable jacket that holds a liquid during activity and provides facilitated access to the liquid may vary depending upon the particular context or application. By way of example, and not limitation, the wearable jacket that holds a liquid during activity and provides facilitated access to the liquid described in the foregoing were principally directed to a jacket that has pockets that hold bladders filled with water, and tubes that extend form the bladders to provide access to the liquid contents implementations; however, similar techniques may instead be applied to floatation devices, whereby air bladders can be used alongside the water bladders, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

Applicant requests to amend the Specification herein by incorporating the claims (1-20) language as originally disclosed on Feb. 17, 2015. Per MPEP 608.01(1), "In establishing a disclosure, applicant may rely not only on the description and drawing as filed but also on the claims present on the filing date of the application if their content justifies it."

I claim:

1. A canine hydration system comprising:
   a) a jacket comprising:
      1) a primary pocket positioned at a first lateral side of the jacket, wherein the primary pocket is configured to be positioned on a first lateral side of a canine when worn;
      2) a dispensing pocket;
      3) at least one harness extending from the first lateral side of the jacket to a second lateral side of the jacket, wherein the at least one harness is configured to traverse the ventral side of the canine when worn;
      4) a cable fastener; and
      5) a collar configured to circumferentially engage the neck of the canine when worn, wherein the dispensing pocket, the cable fastener, and the collar are positioned at a lateral midpoint of the jacket, wherein the dispensing pocket, the cable fastener, and an upper midpoint of the collar are configured to be positioned on the sagittal plane of the dorsal side of the canine when worn, and wherein the dispensing pocket is positioned between the collar and the cable fastener;
   b) a first bladder comprising:
      1) an inlet; and
      2) an outlet, wherein the first bladder is fully contained within the primary pocket;
   c) a valve; and
   d) a primary tube, wherein a first end of the primary tube is in communication with the outlet, and wherein a second end of the primary tube is connected to the valve, wherein a portion of the primary tube and the valve are housed within the dispensing pocket when not in use.

2. The canine hydration system of claim 1, wherein the jacket further comprises a second primary pocket positioned at the second lateral side of the jacket, directly opposite the first primary pocket, wherein the second primary pocket is configured to be positioned on a second lateral side of the canine when worn, and wherein the hydration system further comprises:
   a) a second bladder comprising
      1) an inlet; and
      2) an outlet, wherein the second bladder is fully contained within the second primary pocket;
   b) a t-junction connector;
   c) a first auxiliary tube; and
   d) a second auxiliary tube, wherein a first end of the first auxiliary tube is connected to the outlet of the first bladder, and wherein a first end of the second auxiliary tube is connected to the outlet of the second bladder, wherein the first end of the primary tube, a second end of the first auxiliary tube, and a second end of the second auxiliary tube are connected to the t-junction connector.

3. The canine hydration system of claim 2, wherein the jacket further comprises a secondary pocket positioned at a lateral midpoint of the jacket, wherein the secondary pocket is configured to be positioned on the sagittal plane of the dorsal side of the canine when worn, wherein the secondary pocket is positioned rearward of the cable fastener.

4. The canine hydration system of claim 3, wherein the outlet of the first bladder further comprises a small channel adapted to receive the first end of the first auxiliary tube, and wherein the outlet of the second bladder further comprises a small channel adapted to receive the first end of the second auxiliary tube.

5. The canine hydration system of claim 3, further comprising a collapsible bowl disposed within the secondary pocket.

6. The canine hydration system of claim 5, wherein the valve is a roller valve.

7. The canine hydration system of claim 6, wherein the second end of the primary tube comprises a hand pump configured to actuate a flow of liquid from the first bladder and the second bladder to and through the primary tube.

8. The canine hydration system of claim 7, wherein each of the at least one harness comprises a cushioned sleeve and a harness fastener, wherein the cushioned sleeve wraps around the harness and receives a harness fastener.

9. The canine hydration system of claim 8, wherein the outlet of the first bladder and the outlet of the second bladder may be selectively opened and closed for accessing liquid from the first and second bladder individually or simultaneously.

10. The canine hydration system of claim 9, wherein the first primary pocket and the second primary pocket further comprise a zipper concealed by an overlay extending over the zipper.

11. The canine hydration system of claim 10, wherein volumetric capacity of each of the first bladder and the second bladder is 32 fluid ounces.

12. An animal hydration and travel garment comprising:
a) a jacket configured to be worn on the body of an animal;
b) a front harness portion configured to wrap around the chest of an animal comprising:
  1) an adjustable harness fastener;
  2) at least one cushioned sleeve configured to partially cover the at least one harness and adapted to receive a harness fastener;
c) a rear harness portion configured to wrap around the belly of an animal comprising:
  1) an adjustable harness fastener;
  2) at least one cushioned sleeve configured to partially cover the at least one harness and adapted to receive a harness fastener;
d) a primary pocket disposed to position laterally between an inner surface and an outer surface of the jacket configured to carry a removable bladder wherein the removable bladder is adapted to receive liquid and is disposed in an elevated position within the primary pocket, comprising:
  1) an insulation portion;
  2) an insulation slit configured to enable passage of the removable bladder inside the insulation portion;
e) a secondary pocket;
f) a dispensing pocket disposed on the upper back portion of the animal, the dispensing pocket adapted to hold a discharge end for at least one tube portion, the tube portion further comprising a dispensing end with a valve and a pump;
g) a cable fastener disposed within the outer surface of the jacket between the dispensing pocket and the secondary pocket;
h) a removable container being configured to at least partially flatten for stowage, further being configured to at least partially expand for operation, the container being disposed to position inside the secondary pocket portion; and
i) a collar.

13. The animal hydration and travel garment of claim 12, wherein the at least one tube portion can be affixed to a bladder end and further comprising a discharge end, a bifurcated tube affixed to a T-junction, the discharge end disposed to join with an outlet with a dispensing portion comprising a roller valve and a hand pump configured to actuate flow through the outlet of the at least one tube portion.

14. The animal hydration and travel garment of claim 12, wherein the removable bladder is made of material selected from the group consisting of imitation, foam, cellulose insulation, polystyrene, plastic, and a porous material.

15. The animal hydration and travel garment of claim 12, wherein the container consists of a substantially water proof material configured to hold a liquid.

16. The animal hydration and travel garment of claim 12, wherein the primary pocket portion further comprises an illumination portion to illuminate the outer surface of the jacket and protect the user from traffic, the illumination portion comprising light emitting diodes, bulbs, and reflectors.

17. The animal hydration and travel garment of claim 16, wherein the primary pocket portion may further comprise tracking devices and a means for receiving and transmitting location beacons to a global positioning system.

18. The animal hydration and travel garment of claim 16, wherein the illumination portion can display advertising text and graphics.

* * * * *